April 14, 1942.　　W. P. POWERS　　2,280,038
TURN INDICATOR
Filed Oct. 17, 1941
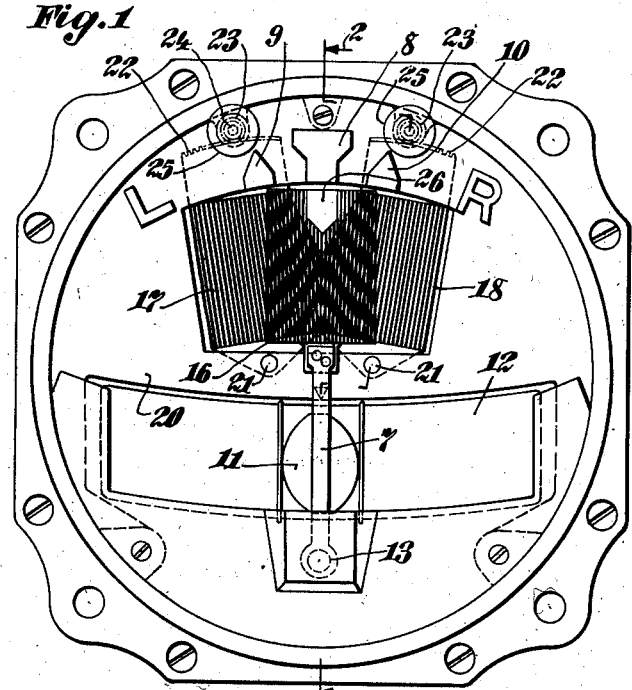
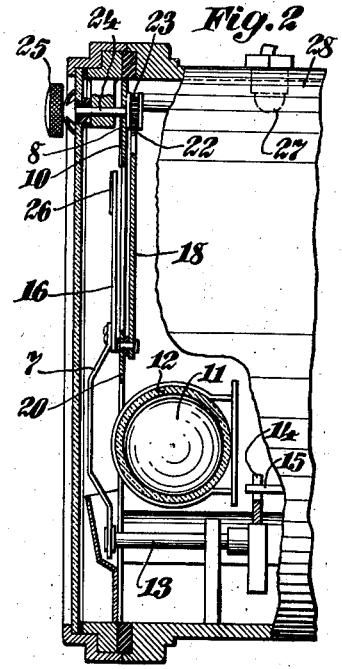
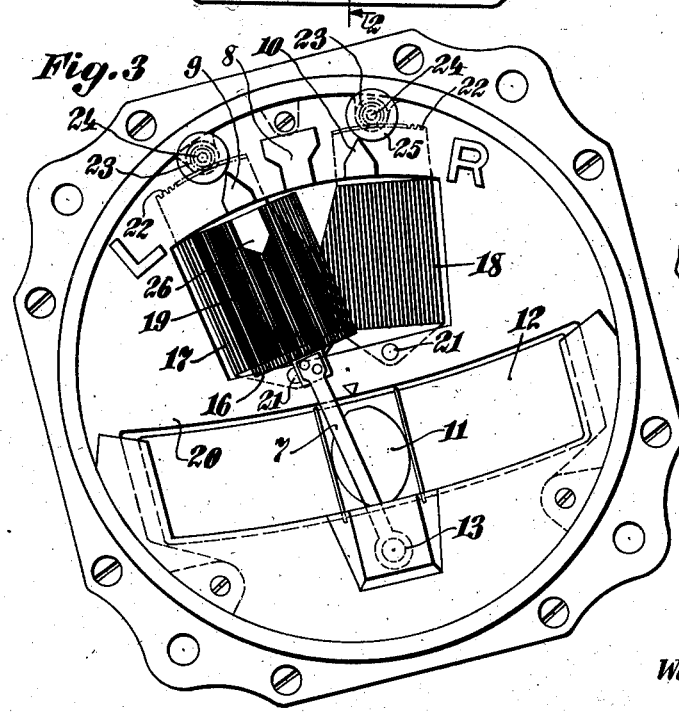
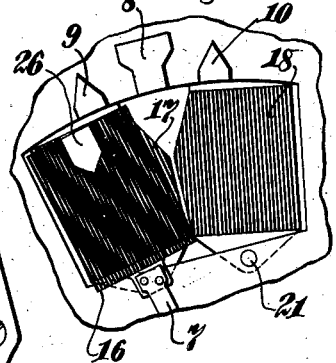
Walter P. Powers,
INVENTOR.
BY Philip S. McLean
ATTORNEY.

Patented Apr. 14, 1942

2,280,038

UNITED STATES PATENT OFFICE 2,280,038

TURN INDICATOR

Walter P. Powers, East Orange, N. J., assignor to Associated Patentees, Inc., Ampere, N. J., a corporation of New Jersey Application October 17, 1941, Serial No. 415,355

10 Claims. (Cl. 116—129)

The herein disclosed invention relates to instruments in the nature of turn indicators, particularly such as disclosed in copending Patent 2,264,640, Dec. 2, 1941.

Special objects of the present invention are to provide a quickly and easily read turn indicator, which by in effect exaggerating the extent of any deviations, will enable the pilot to more readily conform to standard procedure turns and the like; to provide such an indicator which will show maximum sensitivity in approximating the rate turn which is desired to be maintained and to provide an instrument having such qualities which can be adjusted or set as may be necessary, while in actual flight.

Other desirable objects will appear as the specification proceeds and the novel features by which purposes of the invention are attained are hereinafter set forth and broadly claimed.

In the drawing, there is illustrated one practical commercial embodiment of the invention, but it should be appreciated that structure may be modified and changed as regards the instant disclosure all within the true intent and broad scope of the invention, as defined and claimed.

Fig. 1 is a front elevation of a rate of turn and bank indicator form of the invention, as indicating straight ahead or no turn attitude.

Fig. 2 is a broken side view with parts indicated in section as on the plane of line 2—2 of Fig. 1.

Fig. 3 is a front elevation in the condition indicating a standard procedure turn, with the instrument pointer in register with the left procedure turn marker and with the heavy shadow pointer showing such turn as being accurately made.

Fig. 4 is a broken detail showing how the more sensitive shadow pointer will provide an exaggerated indication of any slight deviation from the correct or desired rate of turn.

The instrument shown is of a more or less standardized design in that it comprises a swinging pointer element 7, gyroscopically controlled and adapted to cooperate with straight ahead and left and right turn indications 8, 9, 10, and a ball 11, positioned according to the pull of gravity and centrifugal forces in the curved tube 12.

The pointer lever 7, is shown in Fig. 2, as carried by a spindle 13, having a fork 14, engaged by a pin 15, carried by or actuated from the precessional frame of the gyroscope unit.

To provide the desired easy-reading amplified or exaggerated form of indication, the pointer lever 7 is shown as carrying a parallel lined grid 16, overstanding and cooperable with relatively stationary grids 17, 18, the latter being oppositely inclined to the proper left and right procedure turn positions and lined in vernier relation to the pointer grid to form therewith the heavy shadow pointer or pointers 19.

The three grids may be formed of flat sheet material and be disposed as indicated with the movable grid in close parallel relation in front of the two stationary grids.

As a convenient method of mounting, the stationary grids may be supported on the indicator plate 20, which carries the no-turn and turn markings 8, 9, 10.

In the present disclosure, the relatively stationary grids are mounted for angular adjustment by being pivotally supported on the plate 20, at their lower ends at 21, and by having gear segments 22, at their upper edges engaged by pinions 23, on spindles 24, having adjusting buttons or knobs 25, at the front of the instrument.

While shown pivotally mounted on the back of the instrument plate 20, it is contemplated that the left and right turn grids 17, 18, may be mounted on the front of the supporting plate, in that much closer relation to the back of the movable pointer grid 16.

The movable grid is shown as carrying a pointer indication 26, at the top similar to the regular or standard pointer for cooperation with the "no turn" and turn markings 8, 9, 10.

The grids may be made of light, thin, transparent sheet material, with the lines parallel and equal in width to the spaces between the lines. If made of non-transparent material, the lines may be formed by cutting equally spaced parallel slots in such material. In either event, desirable illumination may be provided as by locating a small lamp 27, in the instrument case 28, in back of the grids.

The movable pointer grid preferably is the one of finer pitch, with more closely spaced lines, so that the movement of the shadow pointers 19, will be in the same direction as the movement of the regular pointer indicator 26.

In the straight ahead or no turn attitude indicated in Fig. 1, with the pointer grid 16, registering equally on the two side grids 17, 18, a symmetrical pattern is created, with two sets of shadow pointers 19, converging to the center and providing a unique easily read on-course indication. With departure to one side or the other, the symmetrical "herringbone" pattern changes and with proper setting of the side grids, the heavy bars forming the shadow pointers will reach the parallel maximum heavy indication state, Fig. 3, when the pointer is in the correct standard procedure turn position. In such position, the grid pointers are heaviest and hence most prominent and they are also in the relation of maximum sensitivity, so that the slightest deviation from proper procedure turn rate will be instantly observable.

Fig. 4 shows how with very slight movement past the proper procedure turn position, the shadow pointer will indicate a wide deviation, thus instantly warning the pilot of the off-position condition—in this instance, too rapid a turn to the left.

The stationary grids can be set to their proper inclinations, while the craft is in flight, making it possible to accurately position these grids for the desired timed turns. The independent adjustment of the two grids is desirable, because of the possibility that a craft may turn more readily one way than the other. The latter condition may result in the straight ahead indication being more or less unsymmetrical, but a pilot familiar with the operation of the device will then recognize such unsymmetrical pattern as representing the no-turn condition. The procedure turn positions in such case however, would be the same as represented in Fig. 3, since the pointer grid would be in maximum register with the left and right turn grids at the rate of turn proper for the desired left or right turn.

The movable grid may be a light small part, such as to impose no additional or no objectionable load on the gyroscopic mechanism, thus making it possible to incorporate the invention in the instruments of accepted design now in use.

To further emphasize the straight ahead or on-course indication, the relatively adjustable but normally stationary grids 17, 18, may be cut back at the top as indicated at 29, to leave a clear field for the pointer member 26, in the more or less central position of the latter.

Various means for adjustment of the reversely inclined side grids may be provided, the means shown being a simple form of construction but primarily by way of illustration.

What is claimed is:

1. A rate of turn instrument, comprising turn sensitive mechanism, a flat grid of substantially parallel lines movable in the plane of said grid by said mechanism and oppositely inclined relatively stationary flat left and right turn grids in parallel relation to said movable grid and lined in vernier relation thereto, said oppositely inclined relatively stationary grids being disposed in a common plane and said first mentioned grid having a movement to carry it from cooperative relation with one to the other of said reversely inclined grids.

2. A rate of turn instrument, comprising turn sensitive mechanism, a flat grid of substantially parallel lines movable in the plane of said grid by said mechanism and oppositely inclined relatively stationary flat left and right turn grids in parallel relation to said movable grid and lined in vernier relation thereto, said movable grid having a movement to carry it into cooperative relation over said realtively stationary grids and means for varying the inclination of said left and right turn grids in respect to each other and in respect to said movable grid.

3. A rate of turn instrument, comprising turn sensitive mechanism, a flat grid of substantially parallel lines movable in the plane of said grid by said mechanism and oppositely inclined relatively stationary flat left and right turn grids in parallel relation to said movable grid and lined in vernier relation thereto, said movable grid having a movement to carry it into cooperative relation over said relatively stationary grids, said left and right turn grids having an intermediate clear field between them and a pointer element operable with said movable grid in said clear field.

4. A rate of turn instrument, comprising turn sensitive mechanism, a flat grid of substantially parallel lines movable in the plane of said grid by said mechanism and oppositely inclined relatively stationary flat left and right turn grids in parallel relation to said movable grid and lined in vernier relation thereto, said movable grid in a central position cooperating with both the other grids to produce a composite substantially symmetrical pattern.

5. A rate of turn instrument, comprising turn sensitive mechanism, a flat grid of substantially parallel lines movable in the plane of said grid by said mechanism and oppositely inclined relatively stationary flat left and right turn grids in parallel relation to said movable grid and lined in vernier relation thereto, said movable grid in a central position cooperating with both the other grids to produce a composite substantially symmetrical pattern, said movable grid carrying a central pointer indication and said oppositely inclined left and right turn grids having an intermediate clear field between them with which said pointer indication may register in said central position.

6. An instrument of the character disclosed, comprising in combination, a pointer element mounted for swinging movement about a center, from an intermediate position to positions at opposite sides of said intermediate position, a flat grid carried by said pointer element in the plane of swinging movement of said pointer element and having spaced substantially parallel lines disposed in substantial parallelism with the radius of said swinging pointer element, relatively stationary flat grids in substantially parallel relation to said movable grid and disposed at opposite sides of said intermediate position of said pointer element and consisting of spaced substantially parallel lines, substantially parallel with radii of said pointer element center and extending divergently in respect to said center on reverse inclines at opposite sides of said intermediate position, the lines of said relatively stationary reversely inclined side grids being in vernier relation to the lines of said movable grid.

7. An instrument of the character disclosed, comprising in combination, a pointer element mounted for swinging movement about a center, from an intermediate position to positions at opposite sides of said intermediate position, a flat grid carried by said pointer element in the plane of swinging movement of said pointer element and having spaced substantially parallel lines disposed in substantial parallelism with the radius of said swinging pointer element, relatively stationary flat grids in substantially parallel relation to said movable grid and disposed at opposite sides of said intermediate position of said pointer element and consisting of spaced substantially parallel lines, substantially parallel with radii of said pointer element center and extending divergently in respect to said center on reverse inclines at opposite sides of said intermediate position, the lines of said relatively stationary reversely inclined side grids being in vernier relation to the lines of said movable grid, said relatively stationary side grids being each pivotally supported at one end and angularly adjustable about said pivotal supports to enable the setting of said side grids at different inclinations in respect to said intermediate position of the pointer element.

8. An instrument of the character disclosed, comprising in combination, a pointer element mounted for swinging movement about a center, from an intermediate position to positions at opposite sides of said intermediate position, a flat grid carried by said pointer element in the plane of swinging movement of said pointer element and having spaced substantially parallel lines disposed in substantial parallelism with the radius of said swinging pointer element, relatively stationary flat grids in substantially parallel relation to said movable grid and disposed at opposite sides of said intermediate position of said pointer element and consisting of spaced substantially parallel lines, substantially parallel with radii of said pointer element center and extending divergently in respect to said center on reverse inclines at opposite sides of said intermediate position, the lines of said relatively stationary reversely inclined side grids being in vernier relation to the lines of said movable grid, said relatively stationary side grids being each pivotally supported at one end and angularly adjustable about said pivotal supports to enable the setting of said side grids at different inclinations in respect to said intermediate position of the pointer element and means for effecting individual adjustments of said pivotally mounted side grids.

9. An instrument of the character disclosed, comprising in combination, a pointer element mounted for swinging movement about a center, from an intermediate position to positions at opposite sides of said intermediate position, a flat grid carried by said pointer element in the plane of swinging movement of said pointer element and having spaced substantially parallel lines disposed in substantial parallelism with the radius of said swinging pointer element, relatively stationary flat grids in substantially parallel relation to said movable grid and disposed at opposite sides of said intermediate position of said pointer element and consisting of spaced substantially parallel lines, substantially parallel with radii of said pointer element center and extending divergently in respect to said center on reverse inclines at opposite sides of said intermediate position, the lines of said relatively stationary reversely inclined side grids being in vernier relation to the lines of said movable grid, said side grids being coextensively disposed in a common plane at one side of said movable grid and being of greater lateral extent than said movable grid and whereby said movable grid will register with both reversely inclined side grids in said intermediate position.

10. An instrument of the character disclosed, comprising in combination, a pointer element mounted for swinging movement about a center, from an intermediate position to positions at opposite sides of said intermediate position, a flat grid carried by said pointer element in the plane of swinging movement of said pointer element and having spaced substantially parallel lines disposed in substantial parallelism with the radius of said swinging pointer element, relatively stationary flat grids in substantially parallel relation to said movable grid and disposed at opposite sides of said intermediate position of said pointer element and consisting of spaced substantially parallel lines, substantially parallel with radii of said pointer element center and extending divergently in respect to said center on reverse inclines at opposite sides of said intermediate position, the lines of said relatively stationary reversely inclined side grids being in vernier relation to the lines of said movable grid, said divergently related side grids being disposed in back of said movable pointer element grid and said latter grid traveling over the face of said side grids in close relation thereto, to produce in conjunction therewith divergent shadow pointers.

WALTER P. POWERS.